(12) United States Patent
Chang

(10) Patent No.: US 8,314,848 B2
(45) Date of Patent: Nov. 20, 2012

(54) IMAGING DEVICE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 343 days.

(21) Appl. No.: 12/854,301

(22) Filed: Aug. 11, 2010

(65) Prior Publication Data
US 2011/0176016 A1    Jul. 21, 2011

(30) Foreign Application Priority Data
Jan. 19, 2010   (CN) .......................... 2010 1 0300417

(51) Int. Cl.
H04N 5/235        (2006.01)
H04N 5/228        (2006.01)

(52) U.S. Cl. ..................................... 348/222.1
(58) Field of Classification Search .......... 348/345, 348/348, 349, 222.1, 135, 140
See application file for complete search history.

(56) References Cited

U.S. PATENT DOCUMENTS

| | | | |
|---|---|---|---|
| 6,639,625 B1 * | 10/2003 | Ishida et al. | 348/218.1 |
| 6,720,997 B1 * | 4/2004 | Horie et al. | 348/218.1 |
| 7,002,624 B1 * | 2/2006 | Uchino et al. | 348/225.1 |
| 7,315,014 B2 * | 1/2008 | Lee et al. | 250/208.1 |
| 7,856,174 B2 * | 12/2010 | Tanaka et al. | 396/55 |
| 8,035,725 B2 * | 10/2011 | Chen et al. | 348/349 |
| 2003/0020814 A1 * | 1/2003 | Ono | 348/220.1 |
| 2007/0177040 A1 * | 8/2007 | Narabu | 348/294 |
| 2007/0230932 A1 * | 10/2007 | Tanaka et al. | 396/55 |
| 2008/0024390 A1 * | 1/2008 | Baker et al. | 345/1.3 |
| 2008/0030592 A1 * | 2/2008 | Border et al. | 348/218.1 |
| 2008/0219654 A1 * | 9/2008 | Border et al. | 396/89 |
| 2008/0316323 A1 * | 12/2008 | Morita et al. | 348/222.1 |
| 2009/0195666 A1 * | 8/2009 | Chen et al. | 348/218.1 |
| 2009/0268983 A1 * | 10/2009 | Stone et al. | 382/284 |
| 2010/0103300 A1 * | 4/2010 | Jones et al. | 348/302 |
| 2010/0220218 A1 * | 9/2010 | Narabu | 348/234 |

* cited by examiner

*Primary Examiner* — Nicholas Giles
(74) *Attorney, Agent, or Firm* — Altis Law Group, Inc.

(57) ABSTRACT

An imaging device includes an image sensing device, a lens array, and a light-channel plate from the image side to the object side of the imaging device. The image sensing device includes a number of image sensors continuously arranged. The lens array includes a number of lenses. The light-channel plate defines a number of light channels. Each lens is received in a corresponding light channel and aligned with a corresponding image sensor. The imaging device also includes a storing device, a distance sensor and an image processor. The storing device stores a predetermined object distance. The distance sensor is configured for sensing a current object distance and controlling the imaging sensors to sense images if determining the current object distance is larger than the predetermined object distance. The image processor is connected with the image sensors and used for combing the images sensed by the image sensors.

11 Claims, 4 Drawing Sheets

IMAGING DEVICE

BACKGROUND

1. Technical Field

The present disclosure relates to an imaging device having a number of camera modules.

2. Description of Related Art

Currently, if a user wants to obtain high-resolution images, he/she must use an imaging device including a high-resolution image sensor or a high-resolution lens, of which the cost is very high.

Therefore, it is desirable to provide an imaging device that can overcome the above-mentioned limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
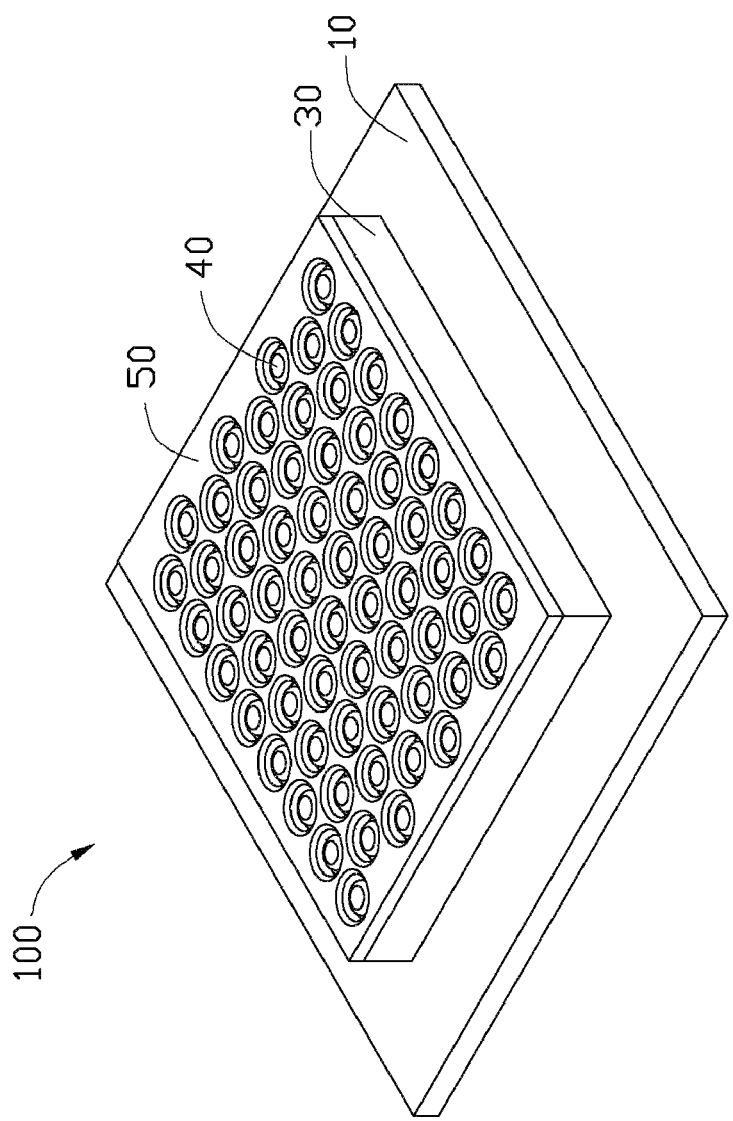
FIG. 1 is a schematic view of an imaging device, according to an exemplary embodiment.
Figure 2:
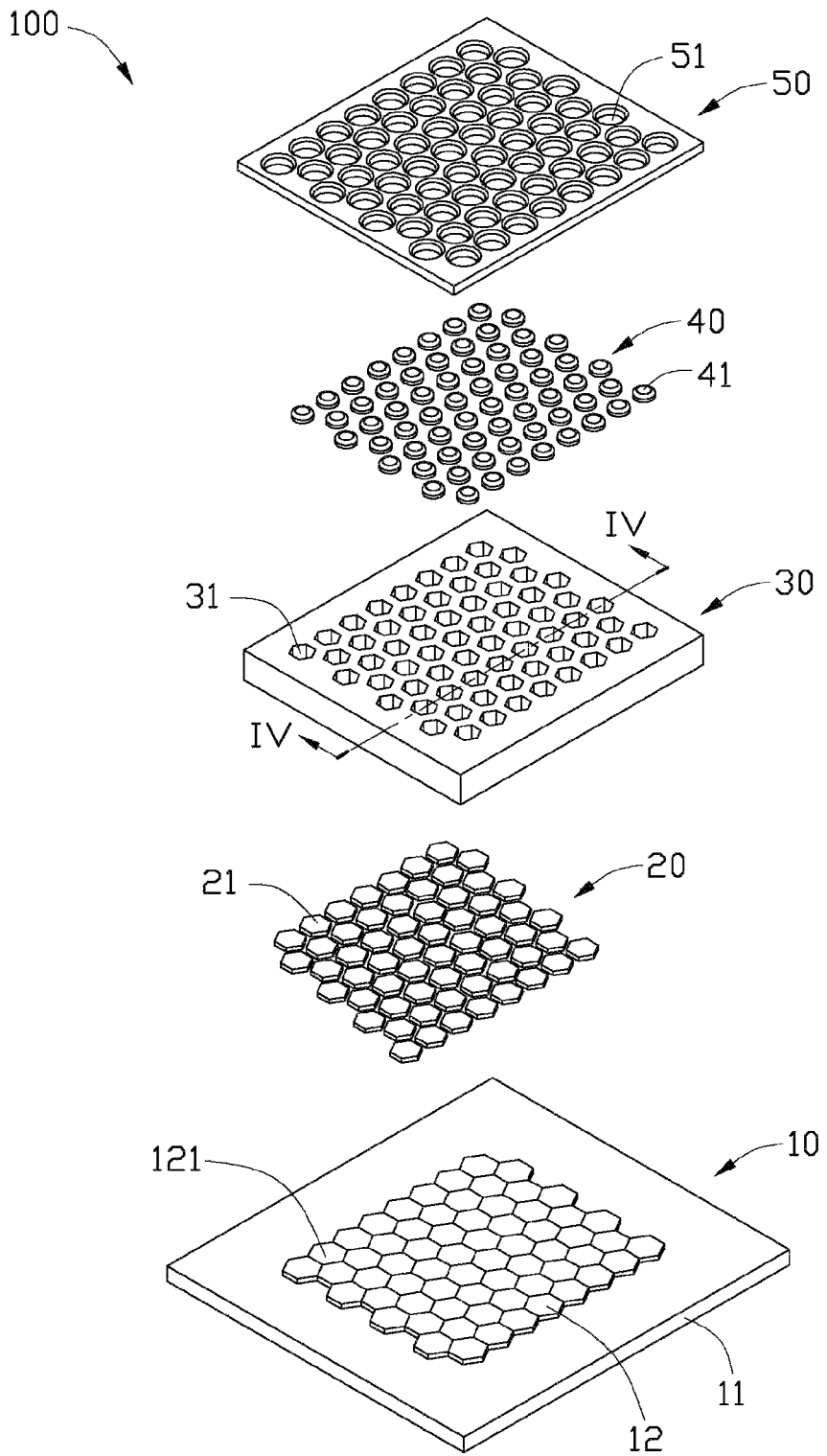
FIG. 2 is an exploded view of the imaging device of FIG. 1.
Figure 3:
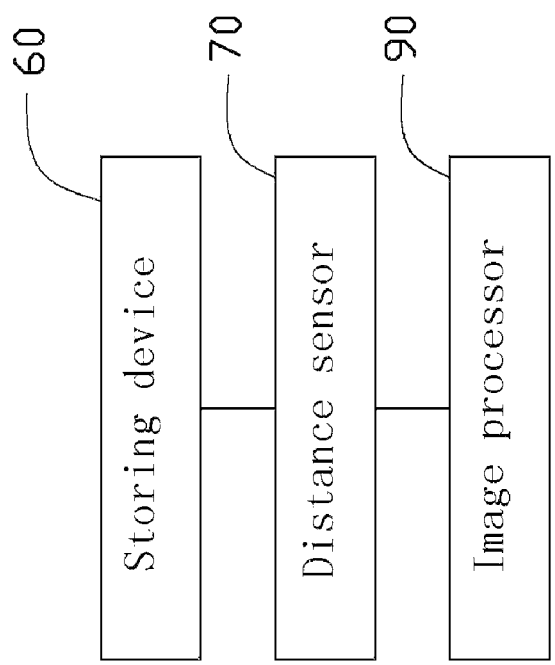
FIG. 3 is a functional block diagram of the imaging device of FIG. 1.

Referring to FIGS. 1-3, an imaging device 100, according to an exemplary embodiment, includes an image sensing device 10, a filter array 20, a spacing plate 30, a lens array 40, and a light-channel plate 50, arranged in this order from the image-side to the object-side of the imaging device 100. The imaging device 100 also includes a storing device 60, a distance sensor 70, and an image processor 90 electrically connected to each other.

The image sensing device 10 includes a base 11 and an image sensor array 12 disposed on the base 11. The image sensor array 12 includes a number of image sensors 121 arranged in a honeycomb pattern, and thus the image sensors 121 can be arranged more compact to reduce the volume of the imaging device 100. Each image sensor 121 includes a number of pixels (not shown). In this embodiment, the image sensors 121 are regular-hexagonal-shaped but can take other geometrical shapes (such as square) in other alternative embodiments.

The filter array 20 includes a number of regular hexagonal filters 21 and is configured for filtering infrared ray (IR). The shape of the filter is not limited to this embodiment, but can be shaped corresponding to the image sensors.

Figure 4:
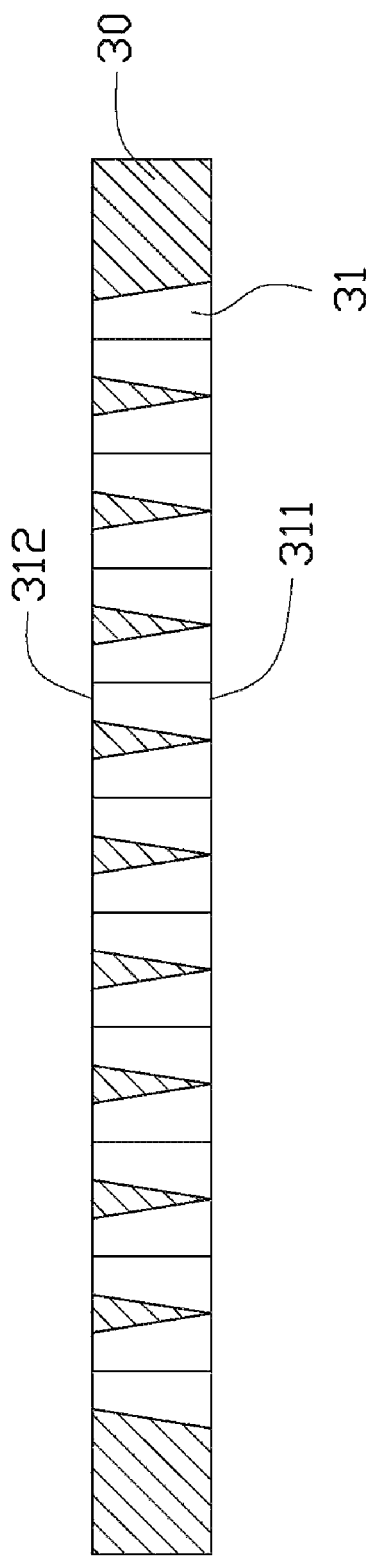
FIG. 4 is a cross-sectional view of the imaging device, taken along the line IV-IV of FIG. 2.

Also referring to FIG. 4, the spacing plate 30 defines a number of regular hexagonal through holes 31 corresponding to the image sensors 121 along the optical axis of the imaging device 100. The through holes 31 are configured for receiving the respective filters 21. Each through hole defines a first opening 311 adjacent to the image sensor array 12 and a second opening 312 adjacent to the lens array 40. Both of the first opening 311 and the second opening 312 are regular-hexagonal-shaped. The first opening 311 is larger than the second opening 312 and is approximately equal to the image sensor 121. The pitch of the first openings 311 is approximately zero. Thus, no shading will be formed on the image sensors 121.

The lens array 40 includes a number of lenses 41 corresponding to the image sensors 121. A surface of each lens 41 facing to the spacing plate 30 is substantially identical of the second opening 312 of the corresponding through hole 31 in shape.

The light-channel plate 50 defines a number of light channels 51 corresponding to the lenses 41 along the optical axis of the imaging device 100 and configured for receiving the lenses 41, and thus the light can enter the imaging device 100 through the light channels 51. Each light channel 51 is trumpet-shaped and includes two opposite openings. The diameter of the opening away from the image sensing device 10 is larger than that of the other opening and thus more light can enter the lens 41. Each light channel 51, the corresponding lens 41, the corresponding filter 21, and the corresponding image sensor 121 are coaxially arranged to form a camera module.

Referring back to FIG. 3, the storing device 60 stores a predetermined object distance. If an object distance is larger than the predetermined object distance, each camera module can capture the entire object. The distance sensor 70 is configured for sensing a current object distance and controlling the imaging sensors 121 to capture images.

The image processor 90 is electrically connected with the image sensors 121 and configured for combining the images captured by the imaging sensors 121 to form an entire image.

An object is composed of a number of object points. Each pixel of the image sensor only can capture a corresponding object point. An image is composed of a number of image points. When the quantity of the image points is more, the resolution of the image is higher. In use, the positions of different camera modules relative to the object are different and drifted a little. Therefore, the object points captured by the different camera modules are different, so when the images are combined, the object points of the entire image are increased to the summation of the object points captured by the camera modules, and thus the entire image becomes a high-resolution image. For example, if a user wants to capture a ruler having a number of scale marks (i.e. 1, 2, 3, 4, 5, 6, 7, 8, 9). A first, second, third camera modules respectively capture the ruler. The first camera module can capture the scale marks 1, 4, 7, the second camera module can capture the scale marks 2, 5, 8, and the third camera module can capture the scale marks 3, 6, 9. Thus, the combined entire image includes the image points of the scale marks 1, 2, 3, 4, 5, 6, 7, 8, 9, and that is to say, the image device can capture more object points and the resolution of the entire image is improved.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:
1. An imaging device, comprising:
an image sensing device comprising a plurality of image sensors, the image sensors being continuously arranged and configured for sensing images;
a lens array comprising a plurality of lenses corresponding to the image sensors;

a light-channel plate defining a plurality of light channels corresponding to the lenses, each light channel receiving a corresponding lens;

a storing device configured for storing a predetermined object distance;

a distance sensor configured for sensing a current object distance, and controlling the imaging sensors to sense images if determining the current object distance is larger than the predetermined object distance; and an image processor electrically connected with the image sensors and configured for combining the images sensed by the image sensors.

2. The imaging device of claim 1, wherein the image sensors each are regular hexagonal-shaped and arranged in a honeycomb pattern.

3. The imaging device of claim 1, wherein the light channel is trumpet-shaped.

4. The imaging device of claim 3, wherein the light channel comprises two opposite openings, the diameter of the opening facing the image sensors is larger than that of the other opening.

5. The imaging device of claim 1, further comprising a spacing plate and a plurality of filters; wherein the spacing plate is positioned between the image sensors and the light-channel plate, the spacing plate defines a plurality of through holes in array along the optical axis of the imaging device, each filter is received in a corresponding through hole and aligned with a corresponding image sensor and a corresponding lens.

6. The imaging device of claim 5, wherein each though hole comprises a first opening adjacent to the image sensors and a second opening adjacent to the lens, the first opening is larger than the second opening and is approximately equal to the image sensor.

7. The imaging device of claim 6, wherein the pitch of the first openings is approximately zero.

8. The imaging device of claim 6, wherein the first opening is regular hexagonal-shaped.

9. The imaging device of claim 6, wherein the second opening is regular hexagonal-shaped.

10. The imaging device of claim 6, wherein a surface of each lens facing to the spacing plate is substantially identical of the second opening in shape.

11. The imaging device of claim 1, wherein the image sensing device comprises a base, the image sensors are positioned on the base.

\* \* \* \* \*